Jan. 13, 1942.   J. E. O. FELLER   2,269,653
FILM WINDING APPARATUS
Filed Dec. 20, 1939    3 Sheets-Sheet 1

Inventor
John E. O. Feller
By Frease and Bishop
Attorneys

Jan. 13, 1942.   J. E. O. FELLER   2,269,653
FILM WINDING APPARATUS
Filed Dec. 20, 1939   3 Sheets-Sheet 2

Inventor
John E. O. Feller
By Frease and Bishop
Attorneys

Jan. 13, 1942.  J. E. O. FELLER  2,269,653
FILM WINDING APPARATUS
Filed Dec. 20, 1939   3 Sheets-Sheet 3
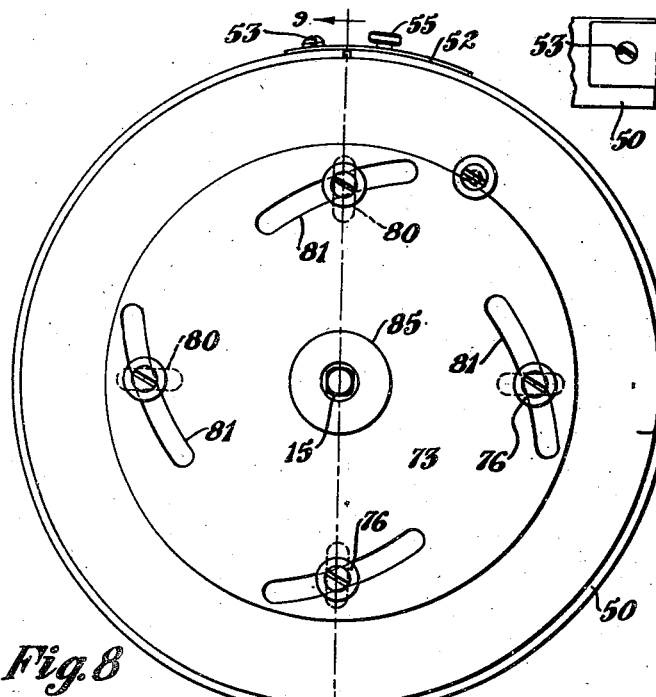
Fig. 8
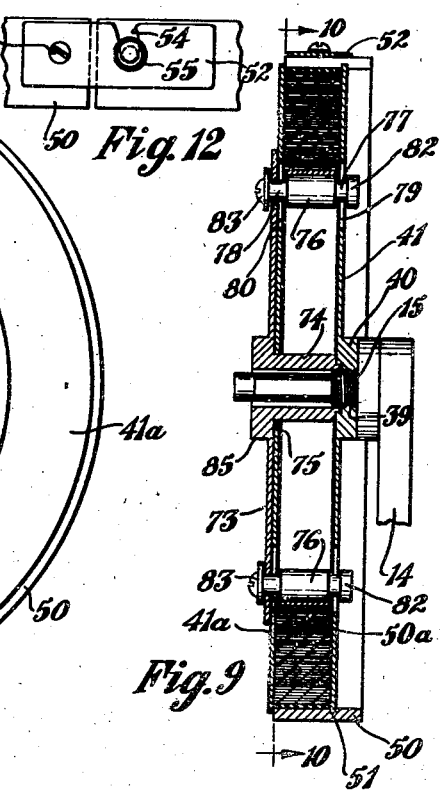
Fig. 12
Fig. 9
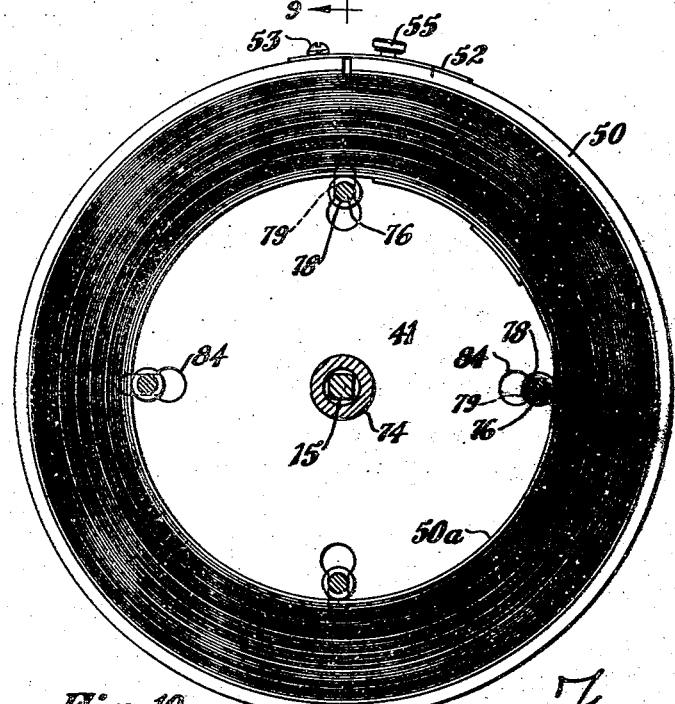
Fig. 10
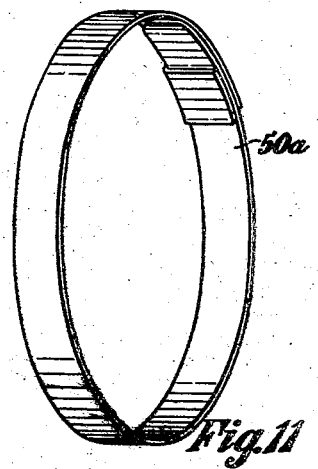
Fig. 11
Inventor
John E. O. Feller Patented Jan. 13, 1942

2,269,653

UNITED STATES PATENT OFFICE 2,269,653

FILM WINDING APPARATUS

John E. O. Feller, Canton, Ohio

Application December 20, 1939, Serial No. 310,195

8 Claims. (Cl. 88—18.7)

The invention relates to apparatus for winding the film after it has passed through a motion picture projector, and more particularly to improvements upon the apparatus disclosed in my co-pending application for Film winding apparatus, Serial No. 137,972, filed April 20, 1937, now Patent No. 2,182,723.

An object of the present invention is to provide an attachment adapted to be installed upon a motion picture projector of any usual and well known construction, to take the place of the usual receiving spool or reel, the attachment including a receiving drum or reel and means for rewinding the film therein from the periphery toward the center, whereby the film is in proper position to permit said receiving drum or reel to be transferred to the usual feed shaft provided upon projectors for receiving the feed reel from which the film is passed through the projector.

Another object is to provide a pivoted or floating lever arm upon which the receiving drum or reel is mounted, whereby the drum with the film being rewound therein is held by gravity in frictional engagement with a driving roller which feeds the film into the drum and rewinds it therein.

A further object is the provision of an improved driving roller for feeding the film into the drum and rewinding it therein, the axis of said roller being inclined relative to the axis of the drum and having a beveled rim flange provided with a friction surface and adapted to engage the edge of the coiled film while the roller itself engages the surface of the film only at a point near its edge.

A still further object is the provision of certain new and novel features in the film feeding mechanism for feeding the film from the projector to the rewinding drum or reel.

Still another object of the invention is the provision of certain new and novel features in the rewinding drum or reel.

Figure 3:
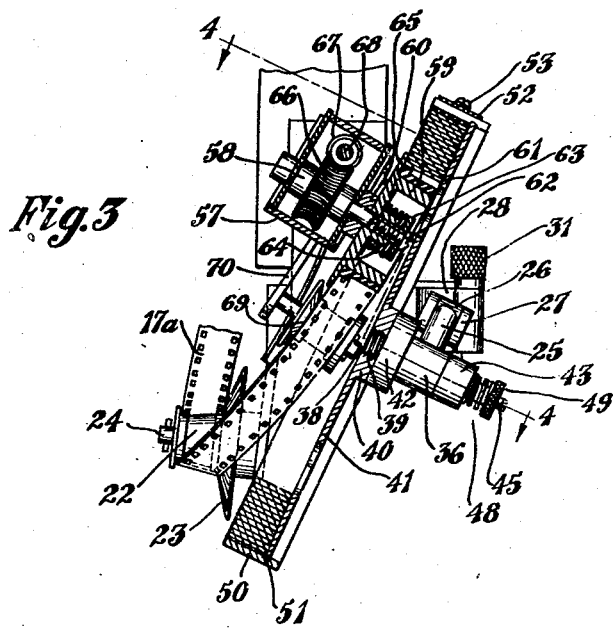
Figure 1:
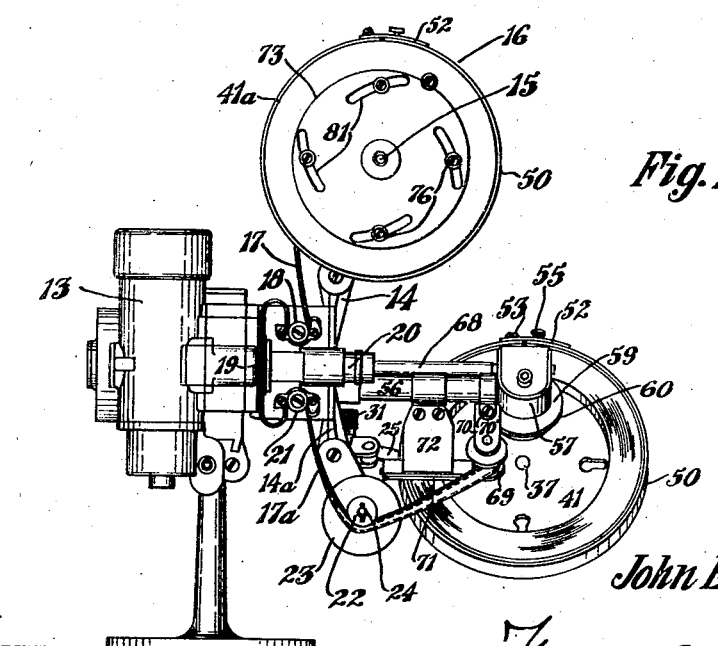
Figure 2:
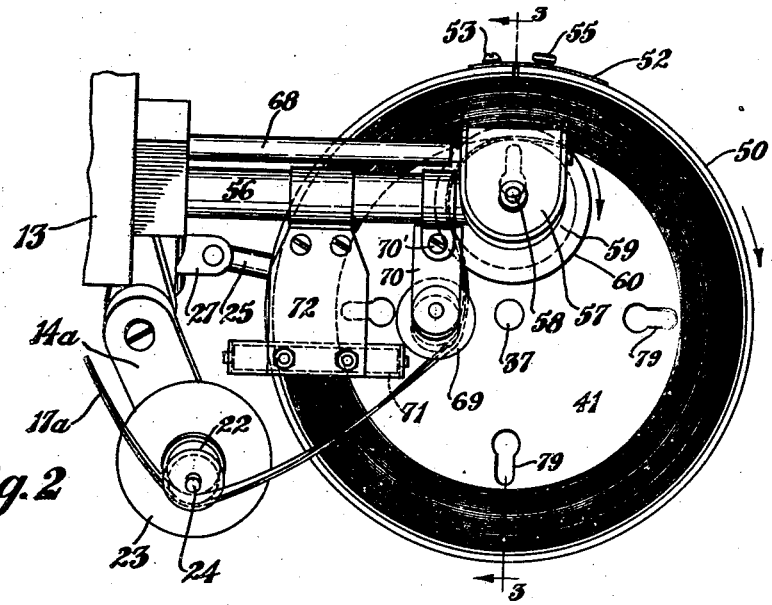
Figure 4:
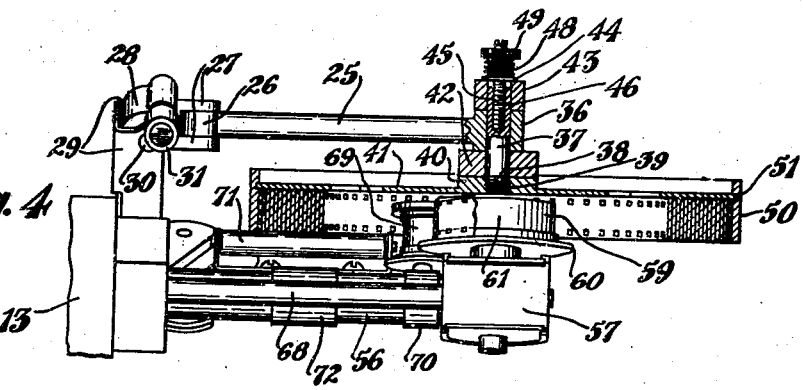
Figure 5:
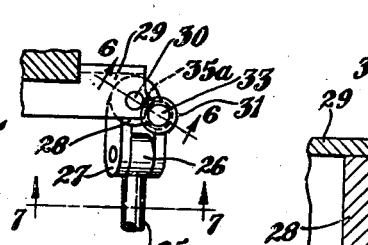
Figure 7:
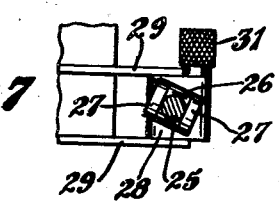
Figure 6:
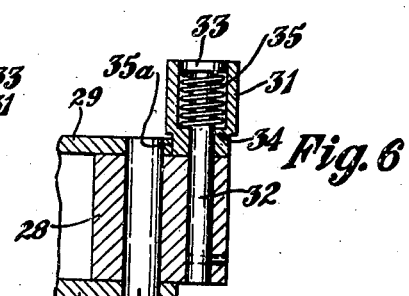

These objects together with others which will be apparent from the drawings and following detail description, or which may be later referred to, may be attained by constructing the improved film winding apparatus in the manner illustrated in the accompanying drawings, in which Figure 1 is a side elevation of a motion picture projector showing the improved film rewinding mechanism applied thereto;

Fig. 2, an enlarged side elevation of the film rewinding mechanism viewed in the normal plane of the receiving drum or reel;

Fig. 3, a vertical sectional view through the film rewinding mechanism taken as on the line 3—3, Fig. 2;

Fig. 4, a plan sectional view through the film rewinding mechanism, taken as on the line 4—4, Fig. 3;

Fig. 5, a detail plan sectional view of the pivotal connection for the floating arm which carries the receiving drum or reel;

Fig. 6, an enlarged detail sectional view taken as on the line 6—6, Fig. 5;

Fig. 7, a vertical sectional elevation taken as on the line 7—7, Fig. 5;

Fig. 8, an elevation of the improved receiving drum or reel;

Fig. 9, a section through the same taken as on the line 9—9, Fig. 8;

Fig. 10, a section on the line 10—10, Fig. 9;

Fig. 11, a detached perspective view of the expanding ring; and

Fig. 12, a detail elevation of the locking means for the split ring which surrounds the drum or reel when used for receiving a film from the projector.

Similar numerals refer to similar parts throughout the drawings.

In Fig. 1 is shown a motion picture projector of usual and well known design indicated generally by the numeral 13, which is provided with the usual upwardly disposed supporting bracket 14 provided with the usual feed shaft 15 upon which the feed reel or spool is adapted to be journaled, as indicated generally at 16, and with the usual downwardly disposed supporting bracket 14a upon which the receiving reel is usually carried.

The film indicated by the numeral 17 is withdrawn from the feed reel 16 in usual and customary manner, passing under the roller 18, then downward through the guide 19 located behind the usual projector lens 20 and then over the pulley 21, passing downwardly therefrom, as indicated at 17a, where in general practice it is wound upon a reel or spool from which it must be later rewound so as to be in proper position to be again passed through the projector.

With the exception that the feed reel 16 is an improved type of reel especially adapted for use with the film winding mechanism to which the invention pertains, all of the parts above referred to may be of any usual and ordinary construction and arrangement such as is common in motion picture projectors now in general use.

The usual receiving reel is removed from the lower supporting bracket 14a and a conical pulley 22 provided with a tapered rim flange 23 is journaled upon the spindle 24 of said bracket.

The rewinding drum or reel is adapted to be carried by a floating arm 25 having its inner end portion enlarged as at 26 and journaled between a spaced pair of angular ears 27 formed upon an adjustable bracket 28 hinged between the horizontally disposed lugs 29 formed upon the projector as by the pin 30.

For the purpose of normally holding the bracket 28 in operative position, a knurled sleeve 31 is slidably mounted upon a pin 32 fixed to the bracket and provided at its upper end with a head 33 between which and the bottom wall 34 of the knurled sleeve is located a coil spring 35 so as to normally hold the lower reduced end of the sleeve 31 in contact with the upper surface of the bracket 28 and within the notch 35a formed in the upper lug 29.

A bearing boss 36 is formed at the outer end of the floating arm 25 and has journaled therein the shaft 37 upon which the receiving drum or reel is adapted to be mounted as by means of the screw threads 38 upon the end of said shaft, adapted to engage the threaded bore 39 in the hub portion 40 of the side plate or disk 41 of the receiving drum or spool.

A spacing collar 42 may be located around the shaft 37 between said hub and the boss 36 and a spacing collar 43 may be also located around the shaft on the other side of the boss 36 and adapted to be held thereon as by a washer or collar 44 located upon a screw threaded rod 45 received in a threaded bore 46 in the outer end of the shaft 37, a coil spring 48 being located between said collar or washer and the knurled nut 49 to adjust the tension upon the receiving drum or reel.

A split peripheral flange ring 50 is adapted to be clamped around the periphery of the disk or side plate 41 of the receiving reel to form an open sided drum and in order to properly position the same upon the side plate or disk, an annular groove 51 may be formed in said ring to receive the peripheral portion of the side plate. This ring may be clamped in position by any suitable means such as the latch plate 52 pivoted as at 53 to one end portion of the split ring and having an arcuate notch 54 adapted to receive the headed stud 55 carried by the other end portion of the ring.

An arm 56 is rigidly connected to the front portion of the projector and carries at its forward end a gear housing 57 within which is journaled an inclined shaft 58 having a drive roller 59 fixed thereon at a point outside of the gear housing 57, the axis of the roller 59 being inclined slightly to the axis of the receiving drum or reel, as best shown in Fig. 3.

A tapered peripheral flange 60 is formed upon the roller 59 and the inner face of this flange, as well as the peripheral surface of the roller, may be covered with rubber or other friction material, as indicated at 61. The roller 59 may be frictionally mounted upon the shaft 58 as by the adjusting screw 62, washer 63 and coil spring 64 located between the roller and the washer, a spacing collar 65 surrounding the shaft between the roller 59 and the adjacent side wall of the gear housing 57.

A worm gear 66 is fixed upon the shaft 58 within the housing 57 and meshes with the worm 67 upon the shaft 68, which is driven in usual and well known manner by mechanism within the projector ordinarily used to drive the receiving reel or spool. An idler pulley 69 may be located in the path of the film between the pulley 22 and the driving roller 59, being preferably mounted upon a bracket 70 suspended from the arm 56 and adjustably mounted thereon as by the clamping screw 70'.

For the purpose of assisting in retaining the coil of film within the drum, a roller 71 may be carried upon a bracket 72 supported upon the arm 56 and bearing against the outer edge of the coil of film within the receiving drum, as best shown in Figs. 2 and 4.

As the projector is operated, the film is withdrawn from the feed reel in usual and customary manner, being passed between the lens and the light in the projector and then downwardly, as indicated at 17a, around the pulleys 23 and 69 and over the driving roller 59.

The ring 50 of the receiving drum is supported by gravity upon the driving roller 59, the film being passed between the inner surface of said ring and the roller and as the roller is driven in the direction of the arrow shown in Fig. 2, the drum is driven in the same direction, coiling the film within the drum from the periphery toward the center thereof and transferring it into the receiving drum or reel in the same position it occupied upon the feed reel, so that it is not necessary to rewind the film before again exhibiting in the projector.

When all of the film has been coiled within the receiving drum or reel, the knurled sleeve or button 31 may be pulled upward, permitting the bracket 28 to swing upon its pivot so as to swing the arm 25, carrying the receiving reel or drum away from the driving roller 59.

The split expanding ring 50a is then placed in the drum within the center of the coil of film, as shown in Fig. 10 and the hub portion 40 of the side plate or disk 41 may be unscrewed from the threaded end of the shaft 37 and screwed upon the threaded end portion of the feed shaft 15. The removable side plate or disk 41a may then be placed in position upon the reel. This side plate 41a has a smaller disk 73 journaled thereon as by the hub 74 fixed to the disk 73 and rotatably mounted within the central opening 75 of the side plate 41a.

A plurality of spacing pins 76 is carried by the plate 41a and its disk 73, these spacing pins having reduced end portions 77 and 78 received through the corresponding radial slots 79 and 80 respectively in the side plates 41 and 41a, the reduced end portions 78 being also received through the curved slots 81 in the disk 73. A head 82 may be formed upon one end of each of the spacing pins 76 and a flange headed screw 83 may be engaged in the other reduced end of each spacing pin to retain them in position.

It should be understood that the spacing pins are normally located at the inner ends of the slots 80 and 81 so that when the side plate 41a is placed in position relative to the reel or drum, the heads 82 of the spacing pins will be received in the enlarged inner ends 84 of the radial slots 79 in the side plate 41.

The disk 73 may then be rotated relative to the side plate 41a, by means of the knob 85, to the position shown in Figs. 8, 9 and 10, moving the spacing pins 76 radially outward and expanding the ring 50a within the coil of film. The latch plate 52 may then be opened and the peripheral flange ring 50 removed from the drum when the film may be unwound from the outside and again passed through the projector.

I claim:

1. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum so that the peripheral ring rests by gravity upon said roller, and means for rotating said driving roller to deliver the film to the interior of said drum and rotate the drum so as to coil the film within said ring.

2. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum and located upon an axis inclined toward the axis of the drum so that the peripheral ring rests by gravity upon said roller, and means for rotating said driving roller to deliver the film to the interior of said drum and rotate the drum so as to coil the film within said ring.

3. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, the axis of the drum being at an angle to the horizontal, a driving roller extending into the open side of said drum so that the peripheral ring rests by gravity upon said roller, and means for rotating said driving roller to deliver the film to the interior of said drum and rotate the drum so as to coil the film within said ring.

4. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, the axis of the drum being at an angle to the horizontal, a driving roller extending into the open side of said drum and located upon an axis inclined toward the axis of the drum so that the peripheral ring rests by gravity upon said roller, and means for rotating said driving roller to deliver the film to the interior of said drum and rotate the drum so as to coil the film within said ring.

5. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum so that the peripheral ring rests by gravity upon said roller, a flange upon said driving roller adapted to frictionally contact the edge of the coil of film within the drum, means for rotating said driving roller to deliver the film to the interior of said drum and rotate the drum so as to coil the film within said ring.

6. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum and located upon an axis inclined toward the axis of the drum so that the peripheral ring rests by gravity upon said roller, a tapered flange upon said driving roller adapted to frictionally contact the edge of the coil of film within the drum, means for rotating said driving roller to deliver the film to the interior of said drum and rotate the drum so as to coil the film within said ring.

7. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum so that the peripheral ring rests by gravity upon said roller, means for rotating said driving roller to deliver the film to the interior of said drum and rotate the drum so as to coil the film within said ring, a substantially radially disposed roller adapted to frictionally contact the edge of the coil of film within the drum.

8. In combination with a motion picture projector having a feed reel shaft, a feed reel mounted on said shaft and means for passing a film from said feed reel through the projector, apparatus for rewinding the film with the leading end outermost including a pivoted arm, a rotatable receiving drum carried by the arm and comprising a side plate and a removable peripheral ring, a driving roller extending into the open side of said drum so that the peripheral ring rests by gravity upon said roller, means for rotating said driving roller to deliver the film to the interior of said drum and rotate the drum so as to coil the film within said ring.

JOHN E. O. FELLER.